(12) United States Patent
Gish et al.

(10) Patent No.: US 8,457,208 B2
(45) Date of Patent: Jun. 4, 2013

(54) ADAPTIVE MOTION ESTIMATION

(75) Inventors: Walter Gish, Oak Park, CA (US); Christopher Vogt, Laguna Niguel, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 207 days.

(21) Appl. No.: 12/746,834

(22) PCT Filed: Dec. 19, 2008

(86) PCT No.: PCT/US2008/087805
§ 371 (c)(1),
(2), (4) Date: Jun. 8, 2010

(87) PCT Pub. No.: WO2009/086181
PCT Pub. Date: Jul. 9, 2009

(65) Prior Publication Data
US 2010/0266041 A1    Oct. 21, 2010

Related U.S. Application Data

(60) Provisional application No. 61/015,148, filed on Dec. 19, 2007.

(51) Int. Cl.
*H04N 7/36* (2006.01)
(52) U.S. Cl.
USPC ................................. 375/240.16; 375/240.15
(58) Field of Classification Search
USPC ........................................ 375/240.15, 240.16
See application file for complete search history.

(56) References Cited

U.S. PATENT DOCUMENTS

| 4,433,207 A | 2/1984 | Best |
| 4,496,972 A * | 1/1985 | Lippmann et al. ............. 348/144 |
| 4,969,041 A | 11/1990 | O Grady et al. |
| 5,161,210 A | 11/1992 | Druyvesteyn et al. |
| 5,319,735 A | 6/1994 | Preuss et al. |

(Continued)

FOREIGN PATENT DOCUMENTS

| EP | 1796386 A1 | 6/2007 |
| EP | 1871098 A2 | 12/2007 |

(Continued)

OTHER PUBLICATIONS

Chuah, T.C., "Distance Metric for soft-decision Decoding in non-Gaussian Channels", Electronis letters Online No. 20030685, vol. 39 No. 14, Jul. 10, 2003. pp. 1062-1063.*

(Continued)

*Primary Examiner* — Sath V Perungavoor
*Assistant Examiner* — Jeffery Williams
(74) *Attorney, Agent, or Firm* — Fish & Richardson P.C.

(57) ABSTRACT

Optimal error metric function for motion estimation is determined and used for video coding and/or video processing of images. To do so, an initial motion estimation using an initial error metric function can be performed. This can produce motion prediction errors. If the initial error metric function is not the optimal error function, then a final motion estimation is performed using a selected optimal error metric function. In some embodiments, a shape of error distribution can be used to determine the optimal error metric function. Some example systems or devices for this motion estimation can include systems or devices for compression, temporal interpolation, and/or super-resolution processing.

33 Claims, 11 Drawing Sheets

U.S. PATENT DOCUMENTS

| | | | |
|---|---|---|---|
| 5,327,237 | A | 7/1994 | Gerdes et al. |
| 5,469,214 | A * | 11/1995 | Bazzaz ............... 348/416.1 |
| 5,530,751 | A | 6/1996 | Morris |
| 5,689,587 | A | 11/1997 | Bender et al. |
| 6,031,914 | A | 2/2000 | Tewfik et al. |
| 6,192,138 | B1 | 2/2001 | Yamadaji |
| 6,272,207 | B1 * | 8/2001 | Tang ............... 378/149 |
| 6,314,518 | B1 | 11/2001 | Linnartz |
| 6,424,725 | B1 | 7/2002 | Rhoads et al. |
| 6,523,114 | B1 | 2/2003 | Barton |
| 6,532,265 | B1 | 3/2003 | Van Der Auwera et al. |
| 6,647,129 | B2 | 11/2003 | Rhoads |
| 6,701,062 | B1 | 3/2004 | Talstra et al. |
| 6,850,567 | B1 | 2/2005 | Frimout et al. |
| 7,039,113 | B2 | 5/2006 | Soundararajan |
| 2002/0131511 | A1 | 9/2002 | Zenoni |
| 2004/0252901 | A1 * | 12/2004 | Klein Gunnewiek et al. ............... 382/240 |
| 2004/0264733 | A1 | 12/2004 | Rhoads et al. |
| 2005/0057687 | A1 * | 3/2005 | Irani et al. ............... 348/443 |
| 2005/0100096 | A1 | 5/2005 | Ho |
| 2007/0174059 | A1 | 7/2007 | Rhoads et al. |
| 2007/0268406 | A1 | 11/2007 | Bennett |
| 2008/0007649 | A1 | 1/2008 | Bennett |
| 2008/0007650 | A1 | 1/2008 | Bennett |
| 2008/0007651 | A1 | 1/2008 | Bennett |
| 2008/0018784 | A1 | 1/2008 | Bennett |
| 2008/0018785 | A1 | 1/2008 | Bennett |

FOREIGN PATENT DOCUMENTS

| | | |
|---|---|---|
| EP | 2232873 A1 | 3/2012 |
| WO | WO9911064 A2 | 3/1999 |
| WO | WO 00/74386 | 12/2000 |
| WO | WO 2005/001773 | 1/2005 |
| WO | WO 2006/136983 | 12/2006 |

OTHER PUBLICATIONS

Weisstein, Eric W. "Laplace Distribution" From MathWorld-A Wolfram web resource: http://mathworld.wolfram.com/LaplaceDistribution.html.*

Jie, Yu "Ranking Metrics and Evaluation Measures", Advances in Imaging and Electron Physics, vol. 144, 2006, pp. 291-316 (pp. 1-36 in electronic version), retrieved from the internet http://lonkinhug.elsevier.com/retrieve/pii/S1076567006440040 (available online Mar. 5, 2007).*

Jie Yu et al., "Ranking Metrics and Evaluation Measures," Advances in Imaging and Electron Physics, vol. 144, 2006, pp. 291-316 (pp. 1-36 in the electronic version), retrieved from the Internet http://linkinghub.elsevier.com/retrieve/pii/S1076567006440040 on Nov. 29, 2010 (available online Mar. 5, 2007).

EPO Office Action for Application No. 08 869094.6 dated Dec. 7, 2010, 8 pages.

Generalized Rate-Distortion Optimization for Motion-Compensated Video Coders, Yan Yang et al; IEEE Transactions on Circuits and Systems for Video Technology, vol. 10, No. 6; Sep. 1, 2000; pp. 947-948.

International Search Report issued for PCT/US2008/087805, mailed May 26, 2009, 4 pgs.

Decision to Grant issued in EP 08869094.6 on Feb. 23, 2012, 2 pages.

Black, M. J. and P. Anandan, "The Robust Estimation of Multiple Motions: Parametric and Piecewise-Smooth Flow Fields," Computer Vision and Image Understanding, vol. 63, No. 1, Jan. 1996, pp. 75-104.

Horn, B. K. P. and B. G. Schunck, "Determining Optical Flow," Artificial Intelligence, vol. 17, pp. 185-203, 1981.

Huber, Peter J., Robust Statistics, John Wiley and Sons, New Jersey, 1980.

Sebe, N., M. S. Lew, and D. P. Huijsmans, "Towards Improved Ranking Metrics," IEEE Trans. On Pattern Analysis and Machine Intelligence, vol. 22, No. 10, pp. 1132-1143, Oct. 2000.

Seferidis, V. and G. Mohammad, "General Approach to Block-Matching Motion Estimation," Optical Engineering, vol. 32, No. 7, pp. 1464-1474, Jul. 1993.

Singh, A., Optic Flow Computation: A Unified Perspective, IEEE Comp. Soc. Press, Los Angeles, 1991.

Tekalp, A. M., Digital Video Processing, Prentice Hall, New Jersey, 1995.

Chen, Zhenyong et al. (Eds.), "A Novel Scrambling Scheme for Digital Video Encryption," PSIVT 2006, LNCS 4319, pp. 997-1006, 2006, Springer-Verlag Berlin Heidelberg, 2006.

* cited by examiner

FIG. 2B target image

FIG. 2A reference image

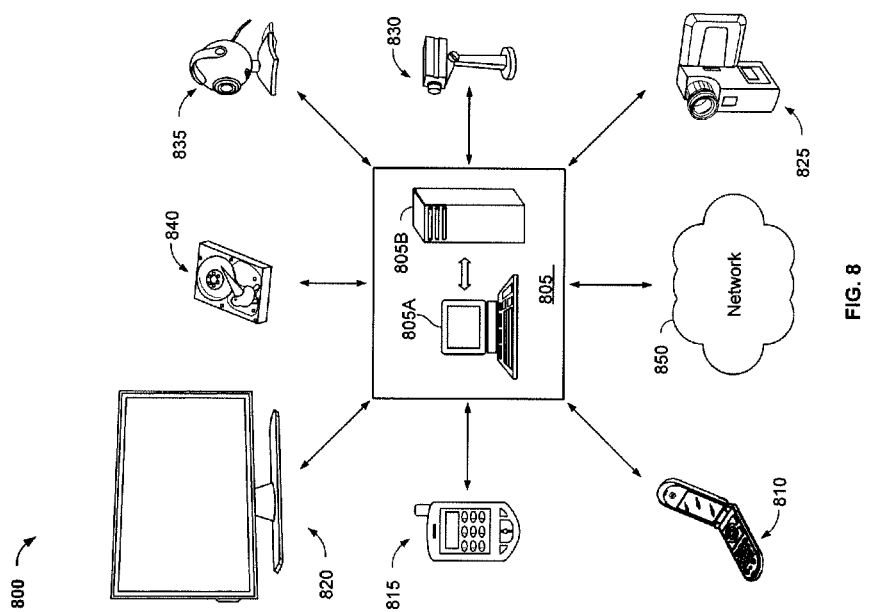

ADAPTIVE MOTION ESTIMATION

CROSS-REFERENCE TO RELATED APPLICATIONS

This application is a filing under 35 U.S.C. §371, and claims the benefit of priority to international patent application number PCT/US2008/087805 filed Dec. 19, 2008, published on Jul. 9, 2009, which claims priority to patent application No. 61/015,148 filed in the United States on Dec. 19, 2007, the contents of which are incorporated by reference in their entirety.

TECHNICAL FIELD

The disclosure relates to motion estimation for images and video data, such as for motion estimation for video compression, storage, processing, display, and/or transmission systems.

BACKGROUND

Motion estimation can be described as a technique for modeling an image in terms of translated copies of one or more parts of a reference picture. The motion estimation itself can be based on a model of image sequences to produce video and image data of a viewable quality. For example, if an image of an object has changed or moved from one frame to the next frame, motion estimation can be used to produce a smooth picture transition.

BRIEF SUMMARY OF EXAMPLE EMBODIMENTS

The following paragraphs present a brief, simplified summary for providing a basic understanding of some aspects of an example embodiment(s) of the presently disclosed techniques. It should be noted that this brief summary is not an extensive overview of aspects of the example embodiments. Moreover, it should be noted that this brief summary is not intended to be understood as identifying any particularly significant aspects or elements, nor delineating any scope of the example embodiment(s) in particular, nor of the techniques in general. The following brief summary merely presents some concepts that relate to the example embodiment(s) in a condensed and simplified format. This brief summary should thus be understood as merely a conceptual prelude to a more detailed description of one of the example embodiments that follow below.

In general, embodiments of the subject matter described in this disclosure feature a method for motion estimation of images to determine an optimal error metric function for the motion estimation. The method involves designating an initial error metric function, and performing an initial motion estimation using the initial error metric function, where the initial motion estimation produces motion prediction errors, also known as motion compensation errors. If the initial error metric function is not the optimal error function, the method involves performing a final motion estimation using a selected optimal error metric function.

These and other embodiments can optionally include one or more of the following features. The method can include determining if the initial error metric function is the optimal error function based on comparison of a distribution of the motion prediction errors of the initial motion estimation with a distribution related to one of a number of error metric functions. If the initial error metric function is not the optimal error function, the method can include selecting the optimal error metric function based on a distribution of the motion prediction errors. The method for performing the initial motion estimation can include processing the initial error metric function to determine the motion prediction errors. The method can involve designating an initial probability distribution related with the initial error metric function.

If the method involves determining if the initial error metric function is the optimal error function, the method can include computing a histogram of the motion prediction errors for the initial error metric function. If the method involves determining if the initial error metric function is the optimal error function, the method can also involve determining a distribution for a statistical best fit of the histogram. If the method involves determining the distribution for the statistical best fit, the method can also involve determining scale factors for a probability distribution of the optimal error metric function.

The candidate probability distributions can include a Gaussian distribution, a Laplacian distribution, and/or a Cauchy distribution. The method can also include performing statistical testing for a best fitting distribution after determining the scale factors. The statistical testing can involve performing a chi-square test for distribution fitting. The initial error metric function can be a Huber metric function, and/or can correspond to an intermediate probability distribution from a number of probability distributions. The probability distributions can involve a Gaussian distribution, a Laplacian distribution, and/or a Cauchy distribution. The initial error metric function can also involve a function of one or more of a sum of absolute differences (SAD), a sum of squared differences (SSD), a mean absolute error (MAD), a mean squared error (MSE), and/or a robust estimator.

The method can involve performing motion estimation in a motion estimation unit of a video encoder, performing inter-prediction for video coding using the optimal error metric function, performing temporal interpolation for video processing using the optimal error metric function, and/or performing super-resolution processing using the optimal error metric function. The method for the inter-prediction for the video coding can include: with a motion estimation unit, receiving a block of pixels and a frame and producing one or more motion vectors; with a motion compensation unit, receiving the frame and the one or more motion vectors and generating a prediction that approximates the block of pixels; and with a subtractor unit, subtracting the prediction from the block of pixels and generating a difference image block. The method for performing the temporal interpolation can include: with a motion estimation unit, receiving a first frame and a second frame and generating one or more motion vectors; and with a bi-directional interpolation unit, receiving the first frame, the second frame, and the one or more motion vectors and generating an approximation of an image that is between times associated with the first and second frames. The method for performing the super-resolution processing can include: with a motion estimation unit, receiving a group of frames that are grouped around a time T and producing one or more motion vectors between a frame in the group at the time T and other frames in the group; with a motion compensation unit, receiving the group of frames and the one or more motion vectors and generating images including a predicted version of each frame in the group of frames; and with a super-resolution processing unit, receiving the images, processing the images, and producing an image at the time T that has a higher spatial resolution than the group of frames. The motion estimation can include block-based or region-based motion estimation. The motion estimation may involve phase correlation or pel-recursive techniques. The motion estimation may also include a motion model, such as a translational, an affine, or a parametric model.

In general, other aspects of the subject matter described in this disclosure include embodiments for a computer program product, tangibly encoded on a computer-readable medium, that includes instructions to cause data processing apparatus to perform operations for motion estimation for images. The operations include designating an initial error metric function, performing an initial motion estimation using the initial error metric function, where the initial motion estimation produces motion prediction errors. The operations also involve, if the initial error metric function is not the optimal error function, performing a final motion estimation using a selected optimal error metric function.

These and other embodiments can optionally include one or more of the following features. There can be operations that involve determining if the initial error metric function is the optimal error function based on comparison of a distribution of the motion prediction errors of the initial motion estimation with a distribution related to one of a number of error metric functions. If the initial error metric function is not the optimal error function, there can be operations for selecting the optimal error metric function based on a distribution of the motion prediction errors. The operations for determining if the distribution is a best fit of the distribution of the motion prediction errors can involve instructions for the following: determining scale factors associated with a number of candidate distributions; performing statistical testing of the number of candidate distributions; and determining if the statistical testing reveals the best fit of the distribution related to one of the number of error metric functions. The statistical testing can involve a Chi-square test. The initial error metric function can be a Huber metric function. The computer program product can include instructions to cause the data processing apparatus to perform operations for performing motion estimation in a motion estimation unit of a video encoder, for performing inter-prediction for video coding using the optimal error metric function, for performing temporal interpolation for video processing using the optimal error metric function, and/or for performing super-resolution processing using the optimal error metric function.

In general, other aspects of the subject matter described in this disclosure include embodiments for a system to perform motion estimation of images. The system includes a display device to display image data, a computer readable medium to store the image data and instructions for image data processing, and a data processing device operable to process the instructions and image data. The instructions cause the device to perform an initial motion estimation using an initial error metric function, where the initial motion estimation produces motion prediction errors. The instructions further cause the device to select the optimal error metric function from one of a number of error metric functions based on a distribution of the motion prediction errors, and if the initial error metric function is not selected as the optimal error function, perform a final motion estimation using the selected optimal error metric function.

These and other embodiments can optionally include one or more of the following features. The display device can be configured to receive image data from the processor to display images having image data with the optimum error metric function. The instructions can further cause the data processing device to compute a histogram of the motion prediction errors based on the initial motion estimation. The system can be configured for high-resolution video, high-quality video, digital cinema, and/or 3-D motion. The data processing device can be or include a motion estimation unit in a video encoder.

In general, other aspects of the subject matter described in this disclosure include embodiments for a computer-implemented method to determine an optimal error metric function for motion estimation. The computer-implemented method involves selecting a first error metric function for an initial motion estimation of images, and performing an initial motion estimation with the first error metric function. The initial motion estimation generates motion prediction errors. The method involves determining if the first error metric function is an optimal error metric function by determining if the first error metric function corresponds to a distribution that is a best fit with a distribution of the generated motion prediction errors. If the first error metric function is not the optimal error metric function, the method includes selecting a second error metric function for the optimal error metric function for a subsequent motion estimation of images, where the selection of the second error metric function corresponds to a distribution that is a best fit with the distribution of the generated motion prediction errors from the initial motion estimation.

These and other embodiments can optionally include one or more of the following features. The first error metric function or second error metric function can be selected from a number of error metric functions. The error metric functions can involve a function that has a distribution for one or more of a Gaussian distribution, a Laplacian distribution, a Cauchy distribution, and/or a Huber distribution. The initial error metric function can include a relationship to a Huber metric function if the first motion estimation or the second motion estimation uses a minimization method for an error metric function with continuous derivatives.

The method can involve computing a histogram of the generated motion errors based on the generated motion prediction errors from the initial motion estimation. If the method involves determining if the first error metric function corresponds to the distribution that is the best fit with the distribution of the generated motion prediction errors, the method can also involve determining scale factors for the distribution of the generated motion prediction errors, and performing statistical testing to determine if the distribution is the best fit with the distribution of the generated motion prediction errors. The method can involve performing motion estimation in a motion estimation unit of a video encoder, performing inter-prediction for video coding using the optimal error metric function, performing temporal interpolation for video processing using the optimal error metric function, and/or performing super-resolution processing using the optimal error metric function.

In general, other aspects include a system for performing inter-prediction for video coding. The system includes a motion estimation unit to receive a block of pixels and a frame and to produce one or more motion vectors. The system has a motion compensation unit to receive the frame and the one or more motion vectors and to generate a prediction that approximates the block of pixels. The system includes a subtractor unit to subtract the prediction from the block of pixels and generate a difference image block. The motion estimation unit is configured to determine an optimal error metric function for motion estimation by processing instructions including: designating an initial error metric function, performing an initial motion estimation using the initial error metric function; and if the initial error metric function is not the optimal error function, performing a final motion estimation using a selected optimal error metric function. The initial motion estimation produces motion prediction errors.

These and other embodiments can optionally include one or more of the following features. The motion estimation unit can determine the optimal error metric function for the motion estimation by processing instructions including: determining if the initial error metric function is the optimal error function based on comparison of a distribution of the motion prediction errors of the initial motion estimation with a distribution related to one of a number of error metric functions; and if the initial error metric function is not the optimal error function, the instructions can further include selecting the optimal error metric function based on a distribution of the motion prediction errors. The instructions and/or processed results may be stored, such as in a storage unit or device. The initial error metric function can be or include a Huber metric function. The system can include a video encoder, in which the motion estimation unit and the motion compensation unit are components of the video encoder. The motion estimation unit can determine a shape of an error metric function and use the shape to determine the optimal error metric function. The difference image block may be a residual.

In general, other aspects involve a system for temporal interpolation for video processing. The system includes a motion estimation unit to receive a first frame and a second frame and to generate one or more motion vectors. The system also includes a bi-directional interpolation unit to receive the first frame, the second frame, and the one or more motion vectors and to generate an approximation of an image that is between times associated with the first and second frames. The motion estimation unit is configured to determine an optimal error metric function for motion estimation by processing instructions including: designating an initial error metric function; performing an initial motion estimation using the initial error metric function; and if the initial error metric function is not the optimal error function, performing a final motion estimation using a selected optimal error metric function. The initial motion estimation produces motion prediction errors.

These and other embodiments can optionally include one or more of the following features. The motion estimation unit may determine the optimal error metric function for the motion estimation by processing instructions including: determining if the initial error metric function is the optimal error function based on comparison of a distribution of the motion prediction errors of the initial motion estimation with a distribution related to one of a number of error metric functions; and if the initial error metric function is not the optimal error function, the instructions can include selecting the optimal error metric function based on a distribution of the motion prediction errors. The initial or optimal error metric function can be or include a Huber metric function. The motion estimation unit can determine a shape of an error metric function and use the shape to determine the optimal error metric function. The system can produce a slow motion video effect if a number of intermediate images at equal subintervals are computed in the system. The system can be configured for frame rate conversion. The system can be configured to use a time associated with the bi-directional interpolation unit to convert a first video stream at a first frequency to a second video stream at a second frequency.

In general, some aspects involve a system for performing super-resolution processing for video processing. The system includes a motion estimation unit configured to receive a group of frames that are grouped around a time T and to produce one or more motion vectors between a frame in the group at the time T and other frames in the group. The system includes a motion compensation unit to receive the group of frames and the one or more motion vectors and to generate images including a predicted version of each frame in the group of frames. The system also includes a super-resolution processing unit to receive the images, process the images, and produce an image at the time T that has a higher spatial resolution than the group of frames. The motion estimation unit is configured to determine an optimal error metric function for motion estimation by processing instructions including: designating an initial error metric function; performing an initial motion estimation using the initial error metric function; and if the initial error metric function is not the optimal error function, performing a final motion estimation using a selected optimal error metric function. The initial motion estimation produces motion prediction errors.

These and other embodiments can optionally include one or more of the following features. The motion estimation unit can determine an optimal error metric function for the motion estimation by processing instructions including: determining if the initial error metric function is the optimal error function based on comparison of a distribution of the motion prediction errors of the initial motion estimation with a distribution related to one of a plurality of error metric functions; and if the initial error metric function is not the optimal error function, the instructions may further include selecting the optimal error metric function based on a distribution of the motion prediction errors. The initial error metric function or the optimal error metric function can be or include a Huber metric function. The motion estimation unit is configured to determine a shape of an error metric function and use the shape to determine the optimal error metric function. The super-resolution processing unit can be configured to extract a higher resolution image from the images by adjusting a Nyquist frequency and increasing a resolution associated with the images.

The disclosed techniques can determine an accurate error distribution and error metric function to generate an accurate motion estimation of images and video. In some instances, the disclosed techniques can consider an actual distribution of motion prediction errors to produce statistically optimal algorithms to select an optimum error function, i.e., F( ), for motion estimation. The generated motion estimates can be optimal and robust. The disclosed techniques can reduce the error in the motion estimates themselves by over a factor of a hundred As a result, the motion prediction errors in sequences of images can be reduced to essentially zero because the image sequence can be accurately modeled. In some embodiments, the disclosed techniques can be used in high-quality video and digital cinema, including video and images presented in 3-D. The disclosed techniques for motion estimation can accurately provide optimal algorithms for complex motion models and complex techniques that minimize the error function by taking a derivative.

Any of the methods and techniques described herein can also be implemented in a system with one or more components, an apparatus or device, a machine, a computer program product, in software, in hardware, or in any combination thereof. For example, the computer program product can be tangibly encoded on a computer-readable medium, and can include instructions to cause a data processing apparatus (e.g., a data processor) to perform one or more operations for any of the methods described herein.

Details of one or more embodiments are set forth in the accompanying drawings and the description herein. Other features, aspects, and results will be apparent from the description, the drawings, and the claims.

DESCRIPTION OF THE DRAWINGS

FIG. 8 depicts an example of a system model.

Like reference numbers and designations in the various drawings can indicate like elements.

DETAILED DESCRIPTION OF EXAMPLE EMBODIMENTS

Figure 1:
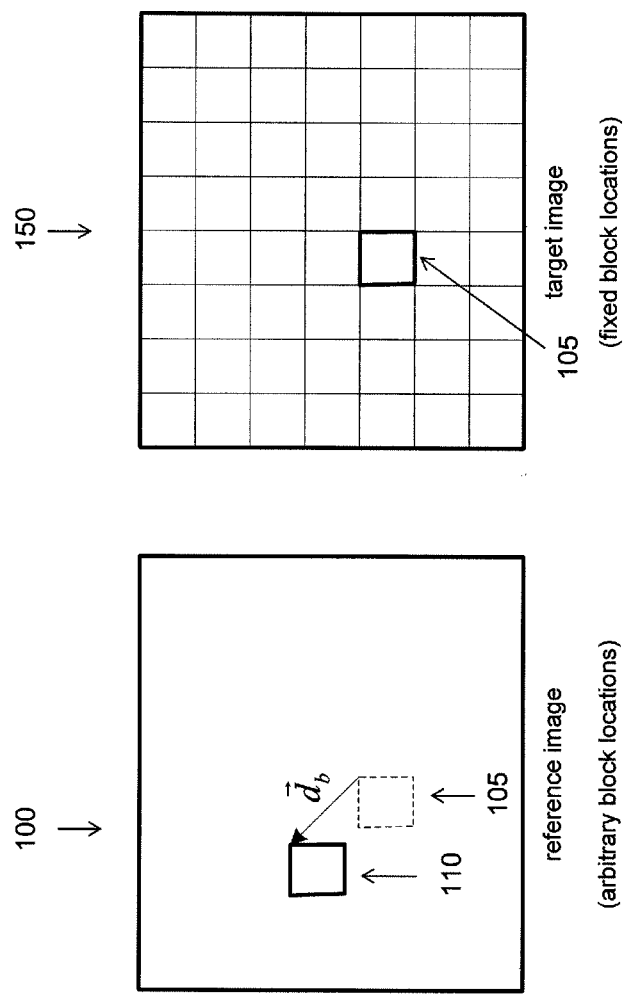
FIG. 1A depicts a diagram with an example of a reference image of a block matching technique.
FIG. 1B depicts a diagram with an example of a target image of the block matching technique.

The general structure and techniques, and more specific embodiments which can be used to effect different ways of carrying out the more general goals, are described herein.

Motion estimation techniques can be characterized by a balance between minimizing the motion compensation (or prediction) error, while maximizing the coherence of the motion field. The coherence of the motion field can be expressed in terms of the motion field's smoothness. The motion for coherent objects is expected to be smooth with each object so that the motion field is only discontinuous at object boundaries. These object boundaries can be referred to as contour edges or silhouette edges.

There are several techniques that attempt to address the motion estimation problem. However, some motion estimation techniques minimize a total error based on a single error metric function without considering the actual statistics of the motion prediction errors (i.e., the errors in the predicted images). Other motion estimation techniques attempt to minimize the total error without determining what the optimal error metric function should be before the minimization is performed. Some of these motion estimation techniques employ a brute force method of using an arbitrarily-selected error metric function without considering modeling of the motion estimation for a particular sequence of images. The motion or optical flow between images may be difficult to be fully determined by only minimizing the motion compensated (or prediction) error when the optimal error metric function has not been determined.

Described below are techniques for selecting the statistically optimal error metric function based on the actual statistics of the motion prediction errors. To aid in the understanding of these techniques, the discussion below first describes motion estimation techniques for block-based motion estimation and dense or per-pixel motion estimation. Next, the discussion describes attempts to add constraints onto some motion estimation techniques to even better determine the motion estimates from the block-based or dense/per-pixel motion estimation approaches. After that, the discussion describes examples of error metric functions and their qualities. Lastly, techniques for selecting the statistically optimal error metric function based on the actual statistics of the errors are described and some example embodiments are presented.

Block-Based Motion Estimation

Some motion estimation techniques involve "matching" methods, such as block matching techniques. For these matching methods, the constraints on a smoothness of the motion field can be imposed by the enforcement of a parametric model for the motion over some region, which can be a block or rectangular region in block matching techniques or, more generally, arbitrarily shaped regions or segments of the images. Although this parametric model can be more general, this model is most commonly a simple displacement. Such block matching techniques often can be referred to as uniform-displacement techniques, where the sum of a function of the prediction errors between a fixed-location block in a target image and a variable location block in a reference image is minimized for each block of the target image.

FIG. 1A depicts a diagram with an example of a reference image 100 of a block matching technique, and FIG. 1B depicts a diagram with an example of a target image 150 of the block matching technique. As shown in FIGS. 1A-1B, the block location 105 in the target image 150 is displaced to another block location 110 in the reference image 100. In this example, the reference image 100 has arbitrary block locations and the target image 150 has fixed block locations. In this block matching example, the target image 150 is referred to as $I_t(\vec{x}_t)$ and the reference image 100 is referred to as $I_r(\vec{x}_r)$, where the horizontal and vertical components of $\vec{x}_t$ and $\vec{x}_r$ can include integer values. Each block b of the target image 150 has a displacement vector $\vec{d}_b$ associated with the target image 150 that minimizes, over that block of the target image, a total error E. In general, the total error E can refer to the sum of some error metric function F( ) applied to the prediction or motion compensation error at each pixel. The total error E can be expressed as follows:

$$E = \sum_{\vec{x}_t \in block} F(e(\vec{x}_t)).$$

The prediction error $e(\vec{x}_t)$ can be expressed as follows:

$$e(\vec{x}_t) = I_t(\vec{x}_t) - I_r(\vec{x}_t + \vec{d}_b).$$

Because of the usual way the equations are expressed, the convention is that $\vec{d}_b$ is actually in the opposite direction for forward motion estimation. The reference image is earlier in time than the target image.

Dense or Per-Pixel Motion Estimation

Figure 2:
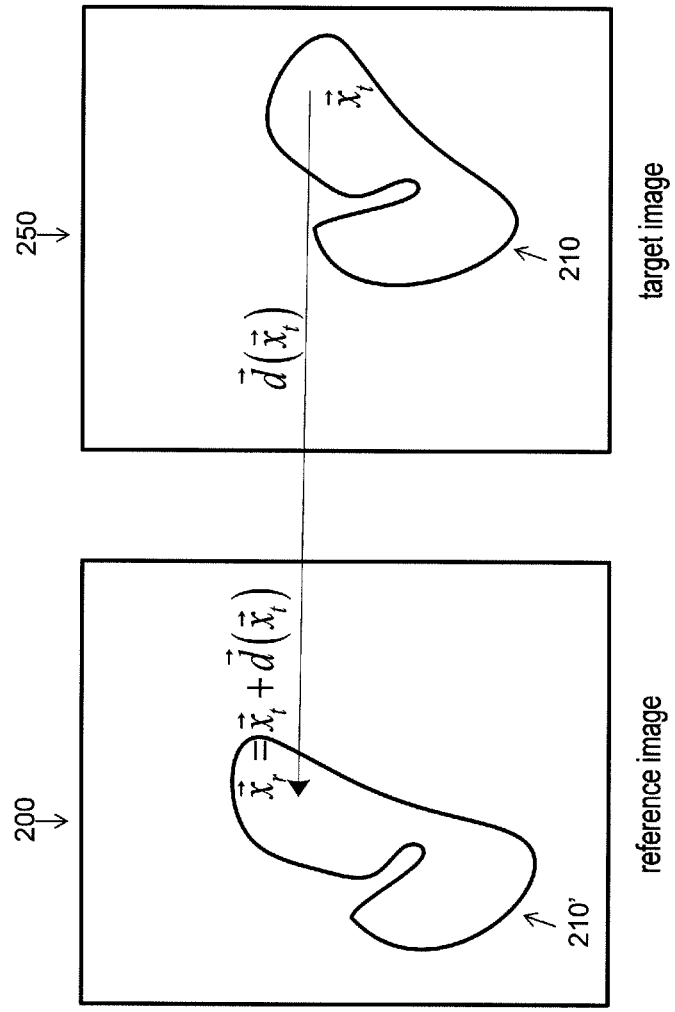
FIG. 2A depicts a diagram with an example of a reference image of a dense or per-pixel motion estimation technique.
FIG. 2B depicts a diagram with an example of a target image of the dense or per-pixel motion estimation technique.

FIG. 2A depicts a diagram with an example of a reference image of a dense or per-pixel motion estimation technique, and FIG. 2B depicts a diagram with an example of a target image of the dense or per-pixel motion estimation technique. The dense motion model can relax the spatial constraints of the block-based model. These dense motion (or per-pixel motion) estimates can be derived from image gradients and can be analogous to the block-based/uniform-displacement techniques. For example, there can be a motion estimate for each pixel in the target image 250, as shown in FIG. 2B.

The function $\vec{d}(\vec{x}_t)$ can be referred to as the displacement field or motion vector field (i.e., it is a vector field). Such per-pixel displacements are often referred to as dense motion estimates. In this example, the motion prediction error $e(\vec{x}_t)$ can be expressed as the following:

$$e(\vec{x}_t) = I_t(\vec{x}_t) - I_r(\vec{x}_r) = I_t(\vec{x}_t) - I_r(\vec{x}_t + \vec{d}(\vec{x}_t)).$$

That is, a point $\vec{x}_t$ in the object 210 of the target image 250 corresponds to a point $\vec{x}_r = \vec{x}_t + \vec{d}(\vec{x}_t)$ in the object 210' of the reference image 200. This model can remove a constraint that the displacement must be constant over rectangular blocks of restricted size and location and can allow the displacement to become a general function of $\vec{x}_t$. Since the dense motion model can relax the spatial constraints of the block-based model, the dense motion model can change the focus of the motion estimation problem on how to determine the displacement field $\vec{d}(\vec{x}_t)$.

Some examples of dense motion estimation techniques are optical flow methods. Although per-pixel displacements provide a more general model for motion, the per-pixel displacements are also more difficult to determine. With per-pixel displacements, the nature of the general motion estimation problem may not be properly addressed. In dense motion estimation, one goal is to determine the horizontal and vertical components of the displacement vector for each pixel. When motion is derived from intensity images, the problem is thus to determine these two components of the motion $\vec{d}(\vec{x}_t)$ from a single constraint (i.e., $e(\vec{x}_t)$, which is small and ideally zero) in image intensity. This approach in determining the two components of motion can leave the motion derivation underdetermined and unreliable. In other words, the minimization of just a function of the motion prediction errors, $$E = \sum_{\vec{x}_t} F(e(\vec{x}_t)) = \sum_{\vec{x}_t} F(I_t(\vec{x}_t) - I_r(\vec{x}_t + \vec{d}(\vec{x}_t))),$$

may not lead to the desired result of estimating the motion. If $\vec{d}(\vec{x}_t)$ is unconstrained, there are many possibilities for the displacement field which could $\vec{d}(\vec{x}_t)$, which could yield a low value for the overall predictive error, E.

Adding Constraints to Add Information for Motion Estimation

Some motion estimation techniques attempt to employ color information to overcome the limitations of dense motion estimation. The color information can involve three channels, such as the Y luminance and the U and V chrominance channels, or the color primaries R red, G green and B blue, or any other suitable representation. By using these color channels, an attempt is made to determine the motion (two parameters) from three constraints, with one on each color component. In practice, however, color is so highly correlated spatially with intensity that there is little information added. Furthermore, the correlation between adjacent pixels can also be high. In an extreme case, such as in a flat textureless area, there is no information to determine motion except at the boundary. From a statistical standpoint, there simply may not be enough local information in $I_t(\vec{x}_t)$ to determine the displacement $\vec{d}(\vec{x}_t)$. Equivalently, this can be expressed as there not being enough information in the reference image at $I_r(\vec{x}_r) = I_r(\vec{x}_t + \vec{d}(\vec{x}_t))$ since $I_r(\vec{x}_t)$ and $I_r(\vec{x}_t + \vec{d}(\vec{x}_t))$ are nearly equal. This result is just a restatement of the underdetermined and ill-posed nature of the motion estimation problem.

Since there may not be enough information in the images to determine $\vec{d}(\vec{x}_t)$ by only minimizing the prediction error itself, it can be helpful to impose one or more additional constraints on $\vec{d}(\vec{x}_t)$. For instance, the first additional requirement can be to impose some spatial coherence or smoothness to $\vec{d}(\vec{x}_t)$. In some techniques, a term can be added to the total error that can embody an additional constraint on the smoothness of the displacement field, as expressed in terms of its gradient $\nabla \vec{d}(\vec{x}_t)$. Consequently, the total error to be minimized can be expressed as $$E = \sum_{\vec{x}_t} (F(e(\vec{x}_t)) + G(\nabla \vec{d}(\vec{x}_t))),$$

and can lead to a more reasonable solution. The function G( ) can be a robust estimator that is analogous to F( ). Robust forms for F( ) and G( ) may yield improved estimates from optical flow techniques.

The motion estimation techniques described with respect to FIGS. 1A-2B tend to minimize a sum similar to $$\sum_{\vec{x}_t} F(e(\vec{x}_t)),$$

along with additional constraints in some cases. The techniques described in the disclosure below address the overlooked and fundamental question of what error metric function F( ) should be selected to produce more accurate and robust motion estimation results when performing motion estimation. Some example error metric functions and their characteristics are first described, and then techniques for selecting the appropriate error metric function are described.

Example Error Metric Functions

Generally, there are three main classes for the error metric function F( ):

(1) F(u)=|u|, commonly known as Mean Absolute Difference (MAD), or equivalently, the Sum of Absolute Differences (SAD), as used in compression;

(2) F(u)=$u^2$, commonly known as the Mean Squared Error (MSE), or equivalently, the Sum of Squared Errors (SSE);

(3) F( ) is a robust estimator,

The absolute value metric (1), often implemented as the sum of absolute differences (SAD), is generally preferred for compression. This metric may be chosen for compression efficiency or simply because it can be the easiest metric to compute. The sum of squared errors (SSE) (2) can be the basis for least-squares problems and solutions. Robust estimators (3) can be a somewhat crude attempt to simply avoid the square-law aspect of (2) or violations of the underlying models. A basic rationale of using the robust estimator can be that the errors fall into two classes: errors that fit an assumed model; and errors that do not fit the assumed model (also referred to as "outliers"). Oftentimes, these outliers will dominate a SSE calculation and degrade its effectiveness.

The three main classes of the error metric function are described next in light of the maximum likelihood theory. Afterwards, techniques for selecting the optimal error metric function based on an analysis of the motion prediction errors themselves are described. The optimal error metric function can refer to the error metric function that best models the motion prediction errors themselves, and correspondingly has a minimum error in the motion estimates themselves when compared to the motion estimates obtained using other types of error metric functions.

In practice there can be errors of different sizes and importance, where some pixels will have a small error and other pixels will have a large error. A purpose of the error metric function F( ) can be to proportionally weigh large and small errors properly during the process in which the overall error is minimized.

In a statistical sense, the optimal weighting between large and small errors can be derived from the underlying probability distribution of the motion prediction errors $e(\vec{x}_t)$. In practice, this distribution of the errors is generally unknown. Using an optimal weighting derived from this distribution can minimize the uncertainty in the estimates of motion that are produced. The expression for such an optimal weighting can come from the statistical notions of maximum likelihood theory, which can show how to relate an error metric function to a given distribution. Maximum likelihood theory can be described as a rigorous method for determining the most probable or most likely estimates of the parameters of a distribution (which are $\vec{d}_b$ or $\vec{d}(\vec{x}_t)$ in this situation) based on given data (e.g., images). The maximum likelihood theory can formally maximize the conditional probability for $\vec{d}_b$ or $\vec{d}(\vec{x}_t)$ given the images $I_t(\vec{x}_t)$ and $I_r(\vec{x}_r)$.

In simple implementations, the maximum likelihood theory can initially assume a known form for the statistics of the prediction error. The simplest assumptions can assume that the errors for each pixel $\vec{x}_t$ are independent with a probability density $P(e_{\vec{x}}|\vec{d})$. Then, the maximum likelihood estimate for the unknown parameters (in this case the motion) is found by minimizing the sum $$-\sum_{\vec{x}} \log[P(e_{\vec{x}} | \vec{d})].$$

In some aspects, the maximum likelihood estimates for motion vectors can refer to those estimates that maximize the likelihood that the motion estimate produced is, in fact, the best that can be obtained. Because the probability for a joint event (these errors) is the product of the probabilities of all the individual events (the motion prediction error at each pixel), this probability, or likelihood, can refer to the product of the likelihoods for each individual pixel. This multiplication of likelihoods can quickly produce very small numerical values, and in fact, they can be so small that they can be difficult to represent with floating-point arithmetic. Since the maximum of a function occurs at the same value as the maximum of the log of a function, the log of the likelihood is maximized. This turns the product into a sum. Mathematically, maximizing the log of something is minimizing the negative of that something. If optimal motion estimation estimates are to be obtained in the maximum likelihood sense, then $$-\sum_{\vec{x}} \log[P(e_{\vec{x}} | \vec{d})],$$

for example, should be minimized.

Thus, every choice for the error metric function F( ) can be optimal only for a particular distribution. For any particular error metric function where the total error is minimized, it can be unclear if the results are optimal in the maximum likelihood sense.

As an example, assume $F(z)=|z|$ is chosen for the error metric function. In the case of block matching, for instance, the total error E can be $$E = \sum_{\vec{x}_t \in block} |e(\vec{x}_t)|.$$

This total error can represent the sum of absolute differences (or SAD). Minimizing this total error as a function of $\vec{d}_b$ produces a motion estimate $\vec{d}_b$ that is also the maximum likelihood estimate for $\vec{d}_b$ if the distribution of prediction errors $e(\vec{x}_t)$ were Laplacian (two-sided exponential) at the true value of $\vec{d}_b$. The Laplacian probability density can be expressed as $$P_{L1}(z) = \frac{1}{2b} e^{-\frac{|z|}{b}},$$

where b is a scale parameter. The corresponding probability distribution can be expressed as $$D_{L1}(z) = \int_{-\infty}^{z} P_{L1}(u) du = \begin{bmatrix} \frac{1}{2} e^{-\frac{|z|}{b}}, z \le 0 \\ 1 - \frac{1}{2} e^{-\frac{|z|}{b}}, z > 0 \end{bmatrix}.$$

Mathematically, this error metric function can be referred to as the "L1" metric function, because it involves the absolute value raised to the power of 1.

Alternatively, assume that $F(z)=z^2$ is chosen as the error metric function. Then the total error is the sum of squared differences (SSD). The minimum of the total error can give the maximum likelihood estimate if the prediction errors are Gaussian. If the prediction errors are Gaussian, the probability density can be expressed as $$P_{L2}(z) = \frac{1}{\sqrt{2\pi}\,\sigma} e^{-\frac{z^2}{2\sigma^2}},$$

where σ is a scale parameter that is often referred to as the standard deviation. The corresponding probability distribution can be written in terms of the error function, erf( ). The probability distribution function can be expressed as $$D_{L2}(z) = \int_{-\infty}^{z} P_{L2}(u) du = \frac{1}{2} + \mathrm{erf}\left(\frac{z}{\sqrt{2}\,\sigma}\right).$$

Mathematically, this type of error metric function can be referred to as the "L2" metric function. If the sums of the L2 metric function are normalized by the number of points in the block, the SAD can become the mean absolute error (MAD) and the SSD can become the mean squared error (MSE).

Because block matching tends to be employed in compression, which happens to be robust to errors in motion estimation and compensation, the issues surrounding the choice of the error metric function F( ) may not be that significant. Typically, the absolute value, or L1 metric function, can work as well as or better than the square, or L2 metric function, and can be easier to compute (e.g., no multiplies) for compression. Consequently, the SAD is almost ubiquitous in compression. But compression does not seek the true motion and, if the true motion is the goal, then the issue of actually finding the optimal error metric function should not be ignored.

There are other types of error metric functions that can be used, other than the L1 and L2 metric functions. For example, one such approach is to use a generalized Gaussian distribution, in which case the absolute value of the error can be raised to integer-power values, such as 1 or 2, or arbitrary, non-integral power values, such as 0.9 or 1.3. This can represent one such approach to unify and generalize the L1 and L2 metrics.

There also can be choices for F(z) that can be less sensitive to large errors, which can be referred to as "outliers". One example is based on the square error metric function, and can truncate the squares that are larger than some threshold T to the value T. This example error metric function can be referred to as the "truncated Gaussian error metric function." A further variety of such functions have been developed in the field of robust statistics. An example of this class of metric function is related to the Cauchy distribution, and can be referred to as the "Lc" metric. The Cauchy distribution (also known as the "Cauchy-Lorentz" or "Lorentz" distribution) can have longer tails than either the Gaussian or Laplacian distributions, and therefore, can be more robust. For the Cauchy distribution, the probability density can be expressed as $$P_{Lc}(z) = \frac{1}{\pi a}\left(\frac{1}{1 + z^2/a^2}\right),$$

where a is the scale parameter. In some cases, a can represent the half-width at half-amplitude. The corresponding probability distribution can be expressed as $$D_{Lc}(z) = \frac{1}{2} + \frac{1}{\pi}\arctan\left(\frac{z}{a}\right).$$

Figure 3:
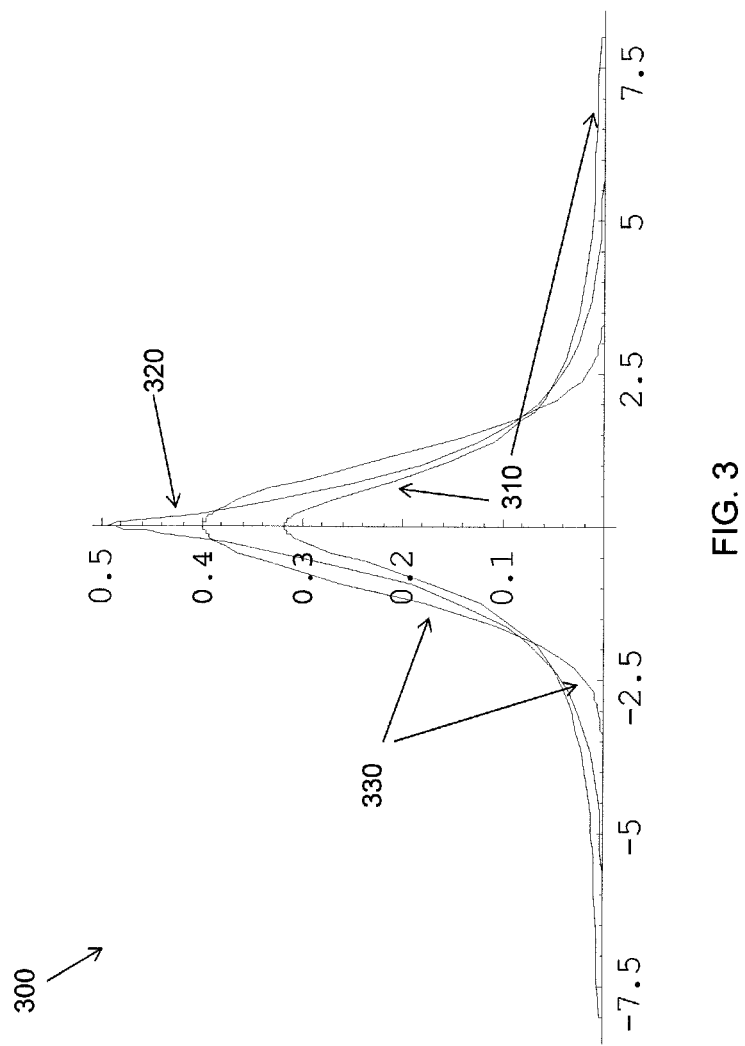
FIG. 3 depicts a diagram with an example of probability densities.

FIG. 3 depicts a diagram 300 with an example of probability densities. The probability densities for three distributions (Gaussian 330, Laplacian 320, and Cauchy 310) described below are qualitatively similar, as shown in FIG. 3.

If the Gaussian distribution 330 is considered the best-behaved distribution, then the Cauchy distribution 310 might be considered the worst-behaving. For instance, the tails of the Cauchy distribution 310 can be just large enough that the integrals for the first and second moments are undefined. Consequently, the mean and variance can be undefined for the Cauchy distribution 310.

While the probability densities for these three distributions may seem qualitatively similar, the corresponding error metric functions can be vastly different. The error metric functions for each distribution are $$M_{L1}(u) = \frac{|u|}{b}$$

$$M_{L2}(u) = \frac{u^2}{2\sigma^2}$$

$$M_{Lc}(u) = \log\left(1 + \frac{u^2}{a^2}\right).$$

Figure 4:
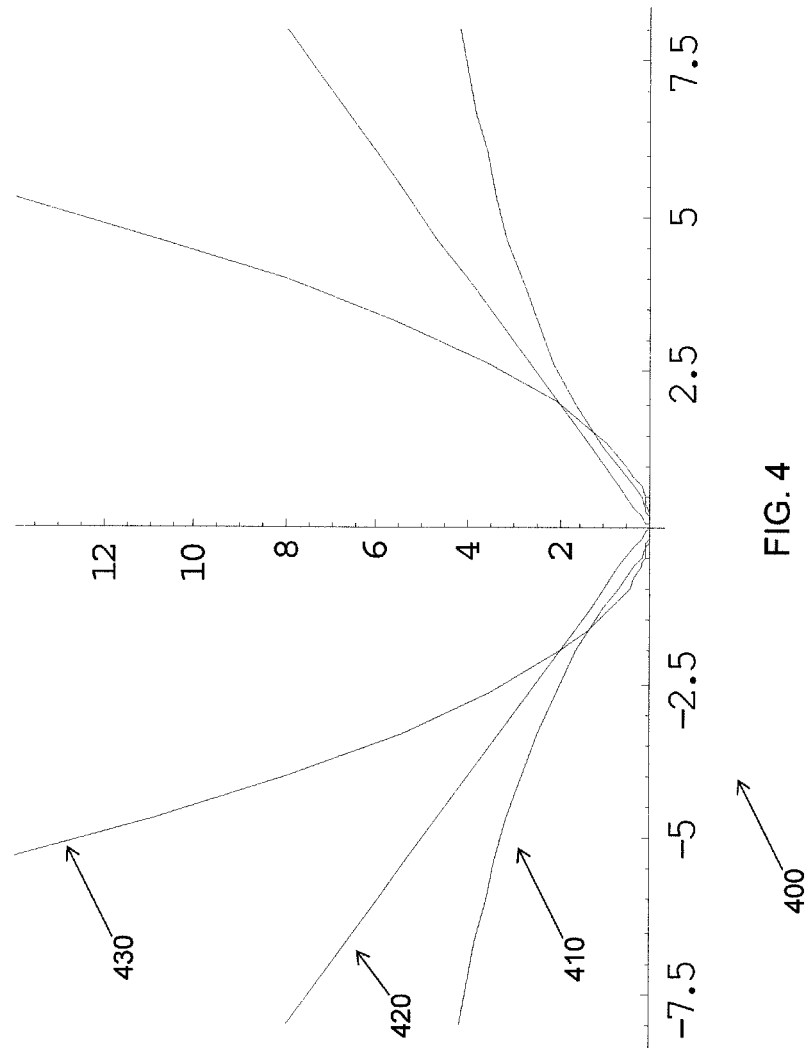
FIG. 4 depicts a diagram with an example of error metric functions.

FIG. 4 depicts a diagram 400 with an example of error metrics functions 410, 420, 430. In FIG. 4, three error metric functions are plotted (for unity scale factors), where the L1 420, L2 430, and Lc 410 error metric functions are shown in the diagram 400. In particular, L1 420 is the Laplacian error metric function, L2 430 is the Gaussian error metric function, and L3 410 is the Cauchy error metric function. Differences amongst the individual error metric functions are shown more clearly in the diagram 400 of FIG. 4 when compared to assessing the differences amongst the individual distributions in the diagram 300 of FIG. 3. This comparison of the differences in the diagrams 300, 400 between the error metric functions and their corresponding distributions can reveal a crux of the problem with arbitrarily selecting an error metric function: just because the error distributions may appear similar, the error metric functions can be quite different, which can have a non-negligible effect on the overall accuracy of motion estimation.

Techniques to Determine an Optimal Error Metric Function

An arbitrary selection of the error metric function may not correspond to the actual distribution of errors when performing motion estimation. If the actual distribution of the error itself is Gausssian, for example, then there would not be much of a problem with overall accuracy because the Gaussian distribution is so well-behaved with outliers occurring rarely. For example, the SSE (L2) metric would be optimal and the SAD (L1) metric would still work well enough for compression. One problem, however, is that these motion prediction errors tend to be decidedly non-Gaussian errors. For instance, one such study concluded that for several different applications, the Gaussian assumption was always the poorest fit to the actual distribution of prediction errors, the two-sided exponential (or Laplacian) distribution was better than the Gaussian distribution and occasionally the best, and the Cauchy distribution was most often the best of the three distributions.

The actual distribution of prediction errors can be used to produce statistically optimal algorithms for motion estimation. In some embodiments, for example, the distribution of predicted errors are used to select the optimum error metric function, i.e., F( ), for motion estimation, where the optimum error metric function accurately models the actual motion prediction errors from the motion estimation and produces motion estimates with minimal error when compared to the same motion estimates produced with other types of error metric functions.

Figure 5A:
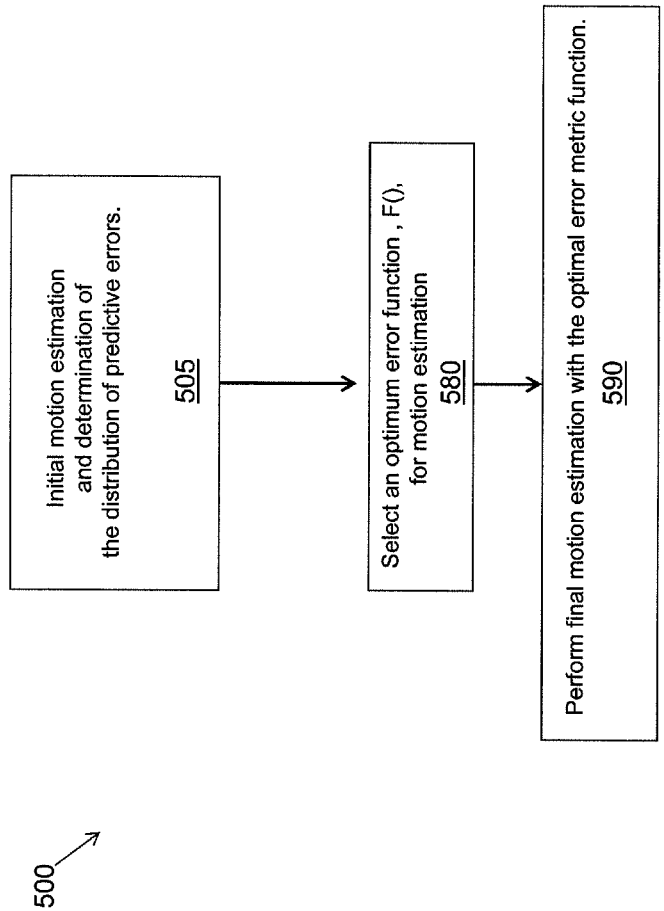
FIGS. 5A-5B depict flow diagrams with examples of performing the motion estimation.
Figure 5B:
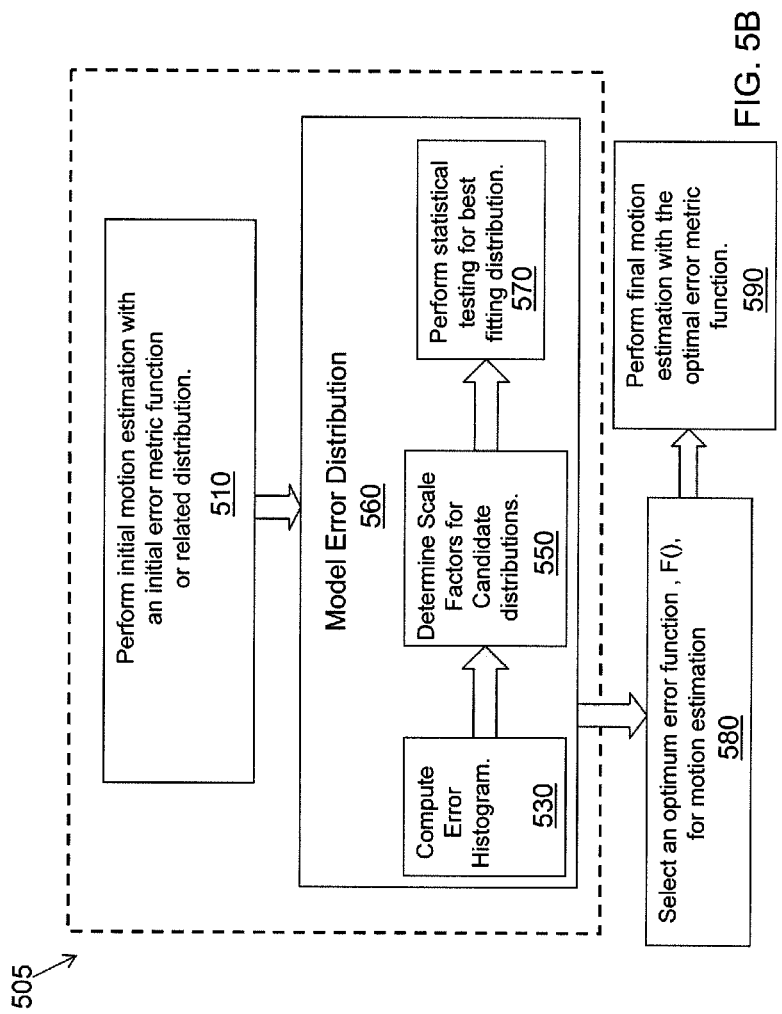

FIGS. 5A-5B depict flow diagrams 500, 505 with examples of determining the motion estimation. Rather that blindly applying some error metric function, the distribution of prediction errors is analyzed and used to select the error metric function. For instance, the optimal error metric function can be selected and then motion estimation can be performed using this optimal error metric function. The selection of the optimal error metric function, at some point in the analysis, can involve actually determining what the optimal error metric function should be based on an analysis of the distribution of the motion prediction errors themselves.

FIG. 5A depicts a flow diagram 500 with an example for motion estimation. An initial motion estimation is performed, followed by statistically optimal algorithms to account for the distribution of prediction errors (505). Based on the actual distribution of motion prediction errors from the initial motion estimation (505), the optimum error metric function, F( ), for the final motion estimation is selected (580). Since there are known distributions corresponding with particular error metric functions (e.g., as illustrated between FIGS. 3 and 4), the optimum error metric function can be selected once the actual distribution of predicted errors has been determined from the initial motion estimation. Then, the final motion estimation is performed (590) with the optimal error metric function.

FIG. 5B depicts a flow diagram with an example that provides more detail with respect to action (505) shown in FIG. 5A. In FIG. 5B, the initial motion estimation is performed (510), and an error histogram is computed to aid in determining the optimal error function. The initial motion estimation can involve the motion estimation associated with, for example, a first frame, a first scene, or a sequence of frames.

In one example of the motion estimation techniques of FIGS. 5A-5B, the three distributions described earlier— Gaussian, Laplacian, and Cauchy—are the possibilities for the distribution, and there is a determination of which candidate distribution is the best fit for observed error data. Although some embodiments could add, change, or vary the type and number of distributions from this example, these three example distributions can serve to demonstrate some aspects for the concepts presented herein.

As described, the process can begin with an initial motion estimation (510), which may not initially use the optimal error metric function. In the absence of additional information, the "intermediate" distribution of the three distributions can be used as a starting distribution. In this example, the Laplacian distribution is an intermediate distribution between the Gaussian and Cauchy distributions (e.g., the associated error metric function 420 for the Laplacian distribution is the middle or intermediate error metric function in FIG. 4), so the initial motion estimation can be performed with the function for the L1 metric function.

After this initial motion estimation is performed, a histogram of the predicted errors (530) can be computed, and the process can then proceed to model the error distribution (560) determine which distribution is the best fit to the observed motion prediction error data. Because most images are on the order of a million pixels, the histogram tends to be well delineated.

After computing the histogram (530), the determination of which distribution is the best fit to the observed error data can occur in two steps. For the first step, there can be a determination of the scale factors (550) that are appropriate for the candidate distributions associated with respective error metric functions. That is, the process can determine a for the best-fitting Gaussian distribution to the computed error histogram (530), b for the best-fitting Laplacian distribution to the computed error histogram (530), and a for the best-fitting Cauchy distribution to the computed error histogram (530). Given these scale factors, a statistical test can be performed (570), such as the Chi-square test for distribution fitting, for each distribution with the observed histogram. The distribution with the best fit to the computed error histogram (530) can then indicate what the corresponding error metric function should be. Thus, the optimal error metric function can be selected based on the distribution with the best fit to the histogram (580), and this optimal metric function can then used to perform the final motion estimation (590).

In some cases, the error metric function initially selected for the initial motion estimation can, in fact, be the optimal error metric function (e.g., the initial motion estimation (510) in FIG. 5B). In this case, the process shown in FIG. 5B simply determines whether or not this optimal error metric function is, in fact, the optimal error metric function (e.g., steps 530, 550, 570). If the initially-selected error metric function is the optical error metric function, then there is no need to perform the selection of the optimum error function (580) or perform the final motion estimation (590).

In alternative embodiments, if the initial motion estimation uses a minimization method that requires an error metric function with continuous derivatives, then the error metric function for the Huber metric function can be initially used instead of the error metric function for the L1 metric function. Since the error metric function associated with the L1 metric function is discontinuous at zero, the error metric function for the L1 metric function has a derivative that is undefined at zero. On the other hand, the Huber metric function can be interpreted as having L1 for large errors and L2 for small ones. The Huber metric function is continuous at zero and can be used in optimization techniques that use derivatives. As a result, the Huber metric function can be well suited to be used for more complex motion models, like the affine model or perspective model. Some of these complex optimization models can have functions that minimize the error metric function by taking a derivative, which is not suitable for the error metric function related to the L1 metric function.

Figure 6:
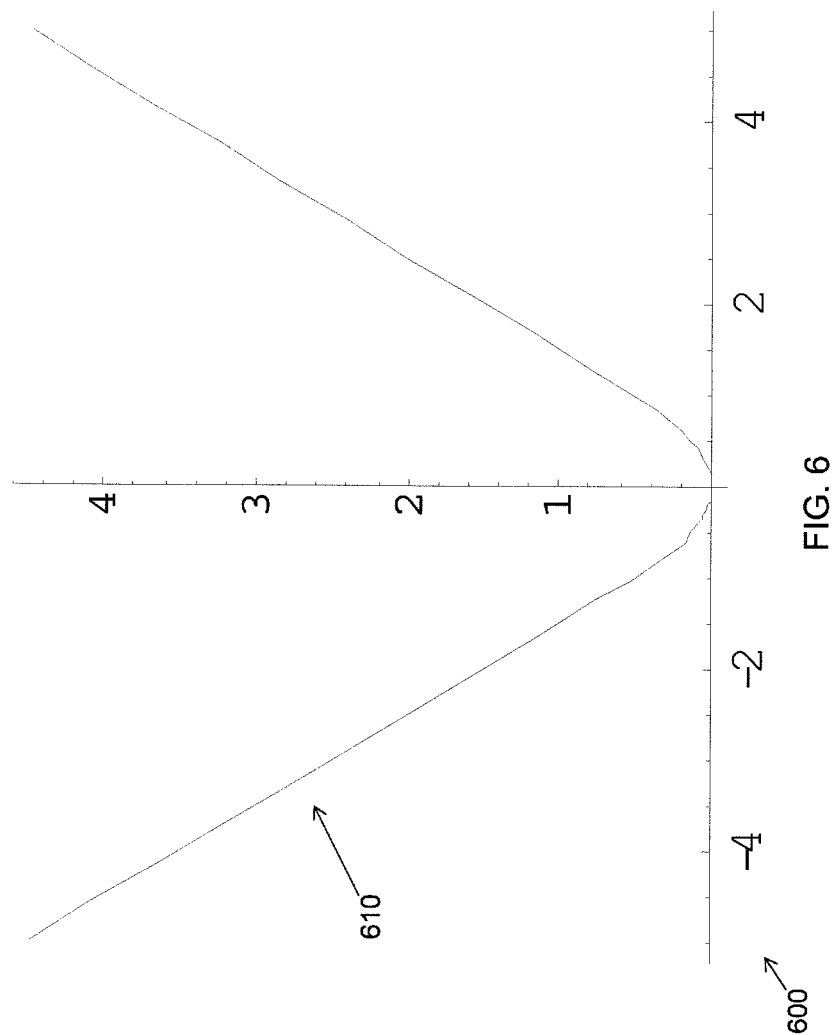
FIG. 6 depicts a diagram with an example of a Huber metric function.

FIG. 6 depicts a diagram 600 with an example of a Huber metric function. The Huber metric function can be defined as $$H(u) = \begin{cases} \frac{u^2}{2\varepsilon}, & |u| < \varepsilon \\ |u| - \varepsilon/2, & |u| \geq \varepsilon \end{cases},$$

and is plotted 610 in FIG. 6, where ε equal is to one. As illustrated in FIG. 6, the Huber metric function is continuous at zero.

Accordingly, in some embodiments the error metric function related to the Huber metric function is used in the initial motion estimation. In particular, the error metric function related to the Huber metric function can be processed for a first frame of a first scene or sequence for initial motion estimation (510). After the statistical testing for the best fit is performed (570) and the optimal error metric function is selected (580), the next frame of that first scene or first sequence can use the generated optimal error metric function instead of the error metric function related to the Huber metric function. When a first frame of a subsequent scene or subsequent sequence of frames commences (i.e., a first frame of a scene or sequence of frames that appears some time after the first frame of the first scene or first sequence of frames), the error metric function related to the Huber metric function can be again selected as the error metric function in the initial motion estimation of that first frame of the subsequent scene or subsequent sequence, and later replaced with the subsequently-selected optimal error metric function once that optimal metric function is determined for the final motion estimation.

Example Embodiments

In other embodiments, the disclosed techniques can be used with motion models that are more complex or sophisticated than the affine or perspective models. In some embodiments, the disclosed techniques can be used in high-quality video and digital cinema, and can be used with 3-D motion.

Although only a few embodiments have been disclosed in detail above, other embodiments are possible and the inventor(s) intend these to be encompassed within this specification. The specification describes specific examples to accomplish a more general goal that may be accomplished in another way. This disclosure is intended to be exemplary, and the claims are intended to cover any modification or alternative.

The motion estimation techniques described herein (e.g., FIGS. 5A, 5B, 6) can be applied to any device and/or system that uses motion estimation. Some examples of devices and/or systems that use motion compensation and/or motion estimation can include devices or systems for compression, temporal interpolation (e.g., slow-motion and frame-rate conversion), and super-resolution processing. For instance, in a general sense, such devices and/or systems may use motion estimation to approximate the image at a different point in time. The approximation (e.g., prediction) can employ the motion estimates and may include motion compensation.

Figure 7A:
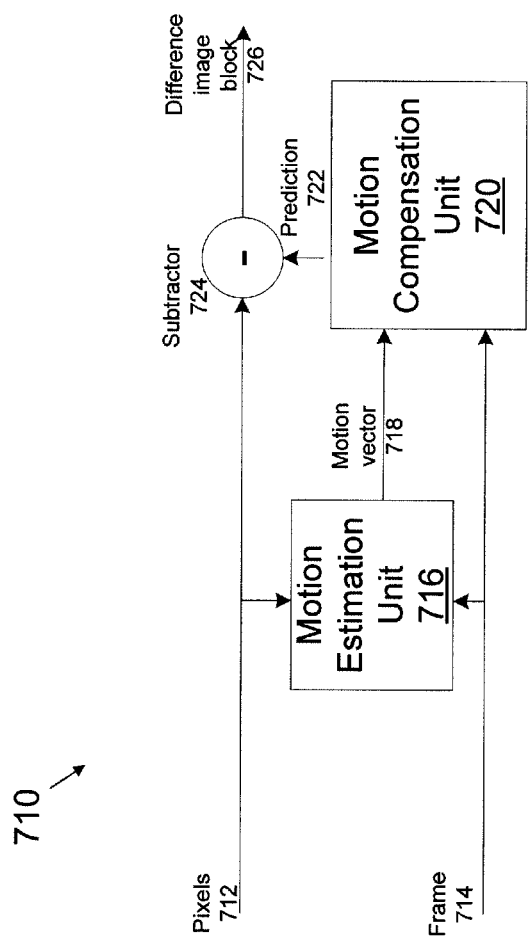
FIG. 7A depicts a schematic with an example embodiment of inter-prediction for video coding.

FIG. 7A depicts a schematic with an example embodiment 710 of inter-prediction for video coding. FIG. 7A shows a motion estimation unit 716, a motion compensation unit 720, and a subtractor 724. These components (e.g., units 716, 720, 724) may be part of a video encoder for video coding.

Two classes of coding methods in video coding can include intra (within a frame) and inter (between frames) coding types. The example embodiment 710 shows an example of inter-prediction for video coding In this example, a block of pixels 712 (typically of size 8×8), which are being coded and a frame 714, which has been previously encoded and decoded, are both sent to a motion estimation unit 716, which produces a motion vector 718 for this block. This motion vector 718 and the previously decoded frame 714 are sent to the inputs of the motion compensation unit 720, which creates a prediction 722 that approximates the block of pixels 712 being coded. The prediction 722 may not be exactly the same as the input block of pixels 712 at least because a single motion vector 718 does not always represent the true motion of every pixel in the block of pixels 712. The prediction 722 and the input block of pixels 712 can be subtracted with a subtractor 724 to produce a difference image block 726 (e.g., a residual). This difference image block 726 is then transformed, quantized, and entropy encoded. By using the advanced motion estimation techniques as detailed in FIG. 5A-6, the motion vectors 718 can be improved, the prediction 722 can be made more accurate, the difference image block 726 (e.g., a residual) can be smaller, and the residual can be more easily encoded.

Figure 7B:
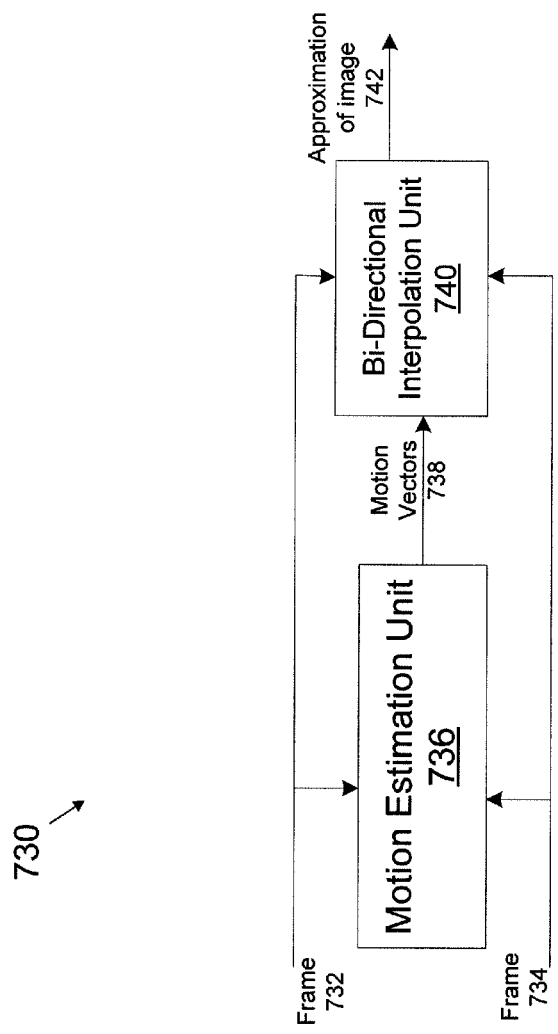
FIG. 7B depicts a schematic with an example embodiment of temporal interpolation for video processing.

FIG. 7B depicts a schematic with an example embodiment 730 of temporal interpolation for video processing. Motion estimation and motion compensation can be used in a high quality system for motion-compensated temporal interpolation, which is shown in 730. Here two frames, frame 732 and frame 734, which are adjacent in time, are fed to a motion estimation unit 736 and a number of motion vectors 738 are computed. The two frames 732, 734 and the motion vectors 738 are then fed to a bi-directional interpolation unit 740, which produces an approximation of the image 742 at an intermediate time that is between the times of the input frames. If a number of intermediate images at equal subintervals are computed, the result can produce a high quality slow-motion effect. In frame rate conversion applications, for example, the time selected for the bi-directional interpolation unit 740 can be used to convert a first video stream (e.g., a 60 Hz (59.97 Hz) video stream, as used in the U.S.A.) to a second video stream (e.g., a 50 Hz video stream, as used in Europe).

Figure 7C:
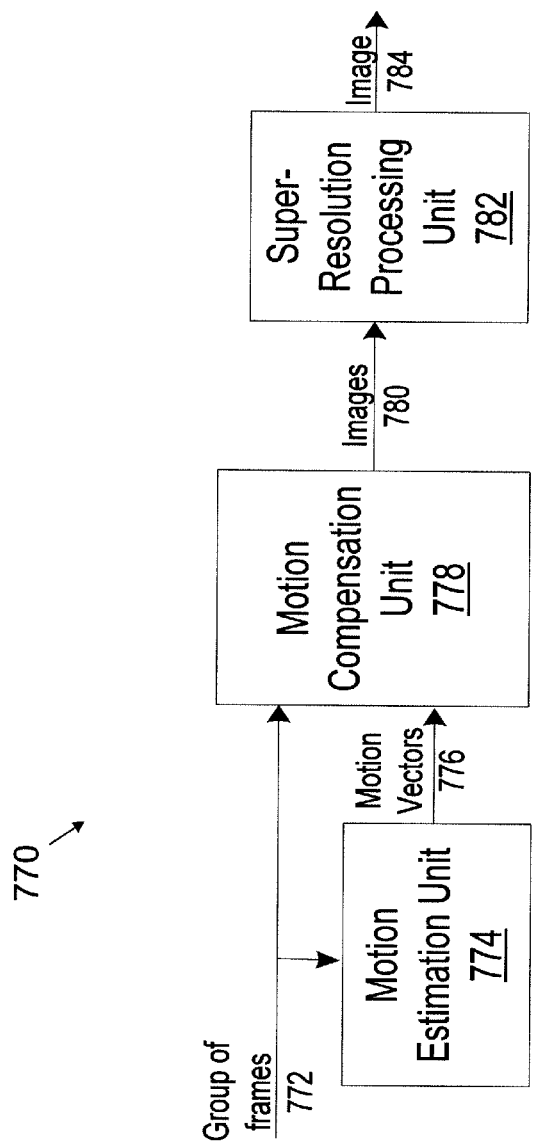
FIG. 7C depicts a schematic with an example embodiment of super-resolution processing for video processing.

FIG. 7C depicts a schematic with an example embodiment of super-resolution processing for video processing. Some applications of motion estimation involve more than just a pair of images, as illustrated in the example embodiments of 710 and 730 in FIGS. 7A and 7B, respectively. Because some embodiments of temporal interpolation and super-resolution may not have a correction for errors caused by inaccurate motion estimation, temporal interpolation and super-resolution can provide enhanced results when using the disclosed advanced motion estimation techniques (e.g., FIGS. 5A-6).

"Super-resolution processing" may generally refer to techniques to extract a high-resolution image from a sequence of lower resolution images. Some example applications of super-resolution processing may be in the areas of surveillance (e.g., generating a high-resolution image from lower resolution images in a video surveillance camera) and astronomy (e.g., generating a high-resolution image from lower resolution images of a distant heavenly body). In an example of super-resolution processing, if the motion vectors of two images are not whole pixels, then after motion compensation the two images may be basically the same below the Nyquist frequency, but different above the Nyquist frequency. Multiple images can be used to disambiguate information above the Nyquist frequency of the original images. This process can permit increasing the Nyquist frequency, and therefore, increasing the resolution.

In FIG. 7C, an example embodiment 770 shows an overall schematic for super-resolution processing. In this example, a group of frames 772 around a time T are inputs to the motion estimation unit 774. The group of frames 772 includes a frame at the time T and other frames around that frame. In the motion estimation unit 774, the motion vectors 776 are computed between the frame at time T and each of the other frames around that frame. These motion vectors 776 and the input group of frames 772 are inputs to a motion compensation unit 778, which produces a predicted version of the frame (e.g., images 780) at time T for every frame input 772. In some embodiments of this example, all the images 780 may correspond to a single time T. The images 780 are inputs to the super-resolution processing unit 782, which processes the images 780 to produce a single image at time T that has a higher spatial resolution than the input images (e.g., group of frames 772).

FIG. 8 depicts an example of a system model. The disclosed techniques can be used on one or more computers 805A, 805B. One or more methods and/or algorithms and/or processes herein can be implemented with, or employed in computers and/or video display 820, transmission, processing, and playback systems. The computers described herein may be any kind of computer, either general purpose, or some specific purpose computer such as a workstation. The computer 805B may be, e.g., an Intel or AMD based computer, running Windows XP, Vista, or Linux, or may be a Macintosh computer. In some embodiments, the computer can also be, e.g., a handheld computer, such as a PDA 815, cell phone 815, or laptop 805A. The computer may also refer to machines or parts of a machine for image recording or reception 825, 830, 835, processing, storage 840, and distribution of data, in particular video data.

Computer and/or graphic programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium. The programs may also be run over a network 850, for example, with a server or other machine sending communications to the local machine, which allows the local machine to carry out the operations described herein.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions tangibly encoded on a computer readable medium for execution by, or to control the operation of, data processing apparatus. The computer readable medium can be a machine-readable storage device 840, a machine-readable storage substrate, a memory device, a composition of matter effecting machine-readable instructions, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a graphical system, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows and figures described and shown in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor can receive instructions and data from a read only memory or a random access memory or both. The essential elements of a computer are a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, some embodiments of the subject matter described in this specification can be implemented on a computer having a display device, e.g., a CRT (cathode ray tube), LCD (liquid crystal display), or plasma display monitor 820, for displaying information to the user and a keyboard and a selector, e.g., a pointing device, a mouse, or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Some embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an embodiment of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software or hardware product or packaged into multiple software or hardware products.

The term "algorithm" can refer to steps, methods, processes, schemes, procedures, operations, programs, guidelines, techniques, sequences, and/or a set of rules or instructions. For example, an algorithm can be a set of video processing instructions for a hardware and/or software video processor. The algorithms may be stored, generated, and processed by one or more computing devices and/or machines (e.g., in some cases, may be performed without human interaction). The disclosed algorithms can be related to video and can be generated, implemented, associated, and/or employed in video-related systems and/or any devices, machines, hardware, and/or articles of manufacture for the processing, compression, storage, transmission, reception, testing, calibration, display, and/or any improvement, in any combination, for video data. These algorithms and techniques are not limited to a particular coding standard, but can be used outside of or in addition to a coding standard. Also, coding dependencies can be investigated between coding schemes in a video coding system to improve coding performance.

Motion estimation could utilize any algorithm to select an optimum error function to improve motion estimation in the manner described above, including improving block based and region based motion estimation, phase correlation, pel-recursive techniques, and the like, and a variety of motion models can be used including translational, affine, parametric, and others. Particular embodiments of the disclosure have been described, such as embodiments for using the distribution of the motion prediction errors to minimize the error in the motion estimates themselves. Some embodiments may involve techniques for an analysis of the distribution of the prediction errors and/or an analysis of different error metrics for different distributions. Some embodiments may include techniques for selecting the optimal error metric using a priori information (e.g., metric X is optimal) and/or an analysis of the actual distribution of the predicted errors. In some embodiments, the shape of error distribution can be used to determine the optimal error metric. In some embodiments, when the optimal error metric is used, the error distribution may tighten up around zero (e.g., the errors are now smaller with the optimum error metric), and in some embodiments the overall shape of the error distribution may be the same. Other embodiments are within the scope of the following claims.

What is claimed is:

1. A computer-implemented method for motion estimation of images to determine an optimal error metric function for the motion estimation of video data, the method comprising:
   selecting an initial error metric function, wherein the initial error metric function is derived from a first distribution of a plurality of candidate distributions;
   performing an initial motion estimation using the initial error metric function, wherein the initial motion estimation produces motion prediction errors;
   computing a histogram of the motion prediction errors for the initial error metric function;
   selecting a distribution from the plurality of candidate distributions by, (i) determining a scale factor for each of the candidate distributions, and (ii) performing a statistical test for distribution fitting between the histogram of the motion prediction errors and each candidate distribution using the associated scale factor;
   selecting an error metric function corresponding to the selected distribution;
   performing a final motion estimation using the selected error metric function; and
   performing inter-prediction for video coding using the selected error metric function.

2. The method as recited in claim 1, if the initial error metric function is not the selected error metric function, the method further comprises selecting the error metric function based on the histogram of the motion prediction errors.

3. The method as recited in claim 1, wherein the performing an initial motion estimation comprises processing the initial error metric function to determine the motion prediction errors.

4. The method as recited in claim 1, further comprising designating the first distribution related with the initial error metric function.

5. The method as recited in claim 1, wherein the selecting a distribution comprises determining the best-fitting distribution for a statistical best fit of the histogram.

6. The method as recited in claim 1, wherein the candidate distributions comprise a Gaussian distribution, a Laplacian distribution, and a Cauchy distribution.

7. The method as recited in claim 1, wherein the statistical testing comprises performing a chi-square test for distribution fitting.

8. The method as recited in claim 7, wherein the initial error metric function comprises a Huber metric function.

9. The method as recited in claim 1, wherein the initial error metric function corresponds to an intermediate candidate distribution of a plurality of candidate distributions.

10. The method as recited in claim 9, wherein the intermediate candidate distribution is a Laplacian distribution.

11. The method as recited in claim 1, wherein the initial error metric function comprises a function of one or more of a sum of absolute differences (SAD), a sum of squared differences (SSD), a mean absolute error (MAD), a mean squared error (MSE), or a robust estimator.

12. The method as recited in claim 1, further comprising performing motion estimation in a motion estimation unit of a video encoder.

13. The method as recited in claim 1, wherein the performing the inter-prediction for the video coding comprises:
   with a motion estimation unit, receiving a block of pixels and a frame and producing one or more motion vectors;
   with a motion compensation unit, receiving the frame and the one or more motion vectors and generating a prediction that approximates the block of pixels; and
   with a subtractor unit, subtracting the prediction from the block of pixels and generating a difference image block.

14. The method as recited in claim 1, further comprising performing temporal interpolation for video processing using the optimal error metric function.

15. The method as recited in claim 14, wherein the performing the temporal interpolation comprises:
   with a motion estimation unit, receiving a first frame and a second frame and generating one or more motion vectors; and
   with a bi-directional interpolation unit, receiving the first frame, the second frame, and the one or more motion vectors and generating an approximation of an image that is between times associated with the first and second frames.

16. The method as recited in claim 1, further comprising performing super-resolution processing using the selected error metric function.

17. The method as recited in claim 16, wherein the performing the super-resolution processing comprises:
with a motion estimation unit, receiving a group of frames that are grouped around a time T and producing one or more motion vectors between a frame in the group at the time T and other frames in the group;
with a motion compensation unit, receiving the group of frames and the one or more motion vectors and generating images comprising a predicted version of each frame in the group of frames; and
with a super-resolution processing unit, receiving the images, processing the images, and producing an image at the time T that has a higher spatial resolution than the group of frames.

18. The method as recited in claim 1, wherein the motion estimation comprises block based or region based motion estimation.

19. The method as recited in claim 1, wherein the motion estimation comprises phase correlation or pel-recursive techniques.

20. The method as recited in claim 1, wherein the motion estimation comprises a motion model comprising a translational, an affine, or a parametric model.

21. A computer program product, tangibly encoded on a non-transitory computer-readable medium, comprising instructions to cause data processing apparatus to perform operations for motion estimation for images, the operations comprising:
selecting an initial error metric function, wherein the initial error metric function is derived from a first distribution of a plurality of candidate distributions;
performing an initial motion estimation using the initial error metric function, wherein the initial motion estimation produces motion prediction errors;
computing a histogram of the motion prediction errors for the initial error metric function;
selecting a distribution from the plurality of candidate distributions by, (i) determining a scale factor for each of the candidate distributions, and (ii) performing a statistical test for distribution fitting between the histogram of the motion prediction errors and each candidate distribution using the associated scale factor;
selecting an error metric function corresponding to the selected distribution;
performing a final motion estimation using the selected error metric function; and
performing inter-prediction for video coding using the selected error metric function.

22. A system to perform motion estimation of images, the system comprising:
a display device to display image data;
a non-transitory computer readable medium to store the image data and instructions for image data processing; and
a data processing device operable to process the instructions and the image data, the instructions causing the data processing device to perform operations comprising:
selecting an initial error metric function, wherein the initial error metric function is derived from a first distribution of a plurality of candidate distributions;
performing an initial motion estimation using the initial error metric function, wherein the initial motion estimation produces motion prediction errors;
computing a histogram of the motion prediction errors for the initial error metric function;
selecting a distribution from the plurality of candidate distributions by, (i) determining a scale factor for each of the candidate distributions, and (ii) performing a statistical test for distribution fitting between the histogram of the motion prediction errors and each candidate distribution using the associated scale factor;
selecting an error metric function corresponding to the selected distribution;
performing a final motion estimation using the selected error metric function; and
performing inter-prediction for video coding using the selected error metric function.

23. A system comprising:
a motion estimation unit to receive a block of pixels and a frame and to produce one or more motion vectors;
a motion compensation unit to receive the frame and the one or more motion vectors and to generate a prediction that approximates the block of pixels; and
a subtractor unit to subtract the prediction from the block of pixels and to generate a difference image block,
wherein the motion estimation unit is configured to determine an optimal error metric function for motion estimation with operations comprising:
selecting an initial error metric function, wherein the initial error metric function is derived from a first distribution of a plurality of candidate distributions;
performing an initial motion estimation using the initial error metric function, wherein the initial motion estimation produces motion prediction errors;
computing a histogram of the motion prediction errors for the initial error metric function;
selecting a distribution from the plurality of candidate distributions by, (i) determining a scale factor for each of the candidate distributions, and (ii) performing a statistical test for distribution fitting between the histogram of the motion prediction errors and each candidate distribution using the associated scale factor;
selecting an error metric function corresponding to the selected distribution;
performing a final motion estimation using the selected error metric function; and
performing inter-prediction for video coding using the selected error metric function.

24. The system of claim 23,
wherein the difference image block comprises a residual,
wherein the system further comprises a display device to display image data, and
wherein the initial error metric function comprises a Huber metric function.

25. The system of claim 22, wherein the system is configured for temporal interpolation for video processing, the system further comprising:
a motion estimation unit to receive a first frame and a second frame and to generate one or more motion vectors; and
a bi-directional interpolation unit to receive the first frame, the second frame, and the one or more motion vectors and to generate an approximation of an image that is between times associated with the first and second frames,
wherein the motion estimation unit is configured to interact with the data processing device to determine an optimal error metric function for motion estimation.

26. The system of claim 25, wherein the data processing device is configured to compute a number of intermediate images at equal subintervals, and wherein a slow motion video effect is produced by the computation of the number of the intermediate images at the equal subintervals.

27. The system of claim 25,
performing a frame rate conversion, wherein the bi-directional interpolation unit is configured to use a time associated with the bi-directional interpolation unit to convert a first video stream at a first frequency to a second video stream at a second frequency.

28. The system of claim 22, wherein the system is configured for performing super-resolution processing for video processing, the system further comprising:
a motion estimation unit configured to receive a group of frames that are grouped around a time T and to produce one or more motion vectors between a frame in the group at the time T and other frames in the group;
a motion compensation unit to receive the group of frames and the one or more motion vectors and to generate images comprising a predicted version of each frame in the group of frames; and
a super-resolution processing unit to receive the images, process the images, and produce an image at the time T that has a higher spatial resolution than the group of frames,
wherein the motion estimation unit is configured to interact with the data processing device to determine an optimal error metric function for motion estimation.

29. The system of claim 28, wherein the super-resolution processing unit is configured to extract a higher resolution image from the images by adjusting a Nyquist frequency and increasing a resolution associated with the images.

30. The system of claim 28,
wherein the motion estimation unit is configured to determine a shape of an error metric function and use the shape of the error metric function to select the error metric function for motion estimation, and
wherein the initial error metric function comprises a Huber metric function.

31. A computer-implemented method comprising instructions to cause data processing apparatus to perform operations to determine an optimal error metric function for a motion estimation of images, the method comprising:
selecting, with the data processing apparatus, a first error metric function for an initial motion estimation of images, wherein the initial error metric function is derived from a first distribution of a plurality of candidate distributions;
performing, with the data processing apparatus, an initial motion estimation with the first error metric function, the initial motion estimation generating motion prediction errors;
selecting a distribution from the plurality of candidate distributions by, (i) determining a scale factor for each of the candidate distributions, and (ii) performing a statistical test for distribution fitting between the motion prediction errors and each candidate distribution using the associated scale factor;
selecting an error metric function corresponding to the selected distribution for a subsequent motion estimation of images; and
performing inter-prediction for video coding using the selected error metric function.

32. The computer-implemented method of claim 31, wherein the first error metric function or second error method function are selected from a plurality of error metric functions.

33. The computer-implemented method of claim 31, wherein the initial error metric function comprises a relationship to a Huber metric function if the first motion estimation or the second motion estimation uses a minimization method for an error metric function with continuous derivatives.

* * * * *